United States Patent
Kobayashi et al.

(10) Patent No.: US 7,209,255 B2
(45) Date of Patent: Apr. 24, 2007

(54) PRINT DATA TRANSFER METHOD FOR REDUCING FIRST PRINT TIME

(75) Inventors: Kouichi Kobayashi, Hyogo (JP);
Hirofumi Nagatsuka, Hyogo (JP);
Tokuo Ikutomo, Hyogo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 964 days.

(21) Appl. No.: 10/387,865

(22) Filed: Mar. 14, 2003

(65) Prior Publication Data

US 2003/0184813 A1    Oct. 2, 2003

(30) Foreign Application Priority Data

Apr. 1, 2002    (JP)    ............... 2002-098775

(51) Int. Cl.
*H04N 1/41* (2006.01)
(52) U.S. Cl. .................. 358/1.15; 358/426.02
(58) Field of Classification Search ............... 358/1.15, 358/426.02; 400/76
See application file for complete search history.

(56) References Cited

U.S. PATENT DOCUMENTS

2003/0011819 A1*  1/2003  Toda ..................... 358/1.15
2003/0025938 A1*  2/2003  Iida ..................... 358/1.15
2003/0031247 A1*  2/2003  Takahashi et al. ........ 375/240

FOREIGN PATENT DOCUMENTS

| JP | 4-144485    | 5/1992  |
| JP | 5-304613    | 11/1993 |
| JP | 8-6238      | 1/1996  |
| JP | 9-200536    | 7/1997  |
| JP | 11-259243   | 9/1999  |
| JP | 2001-282482 | 10/2001 |

* cited by examiner

*Primary Examiner*—Daniel Swerdlow
*Assistant Examiner*—Allen H. Nguyen
(74) *Attorney, Agent, or Firm*—Staas & Halsey LLP

(57) ABSTRACT

A method is provided for transferring print data from a host computer to a printer connected to the host. According to the method, a transfer rate determiner of the host determines the data transfer rate of the interface between the host and the printer. Before the print data is transferred from the host to the printer, the data compress/decompress time by several compression methods is estimated. Also, the data transfer time for the compressed print data is estimated. These times are added to provide a total data process time. Meanwhile, data transfer time for non-compressed print data is estimated. The total data process time for the compressed data and the data transfer time for the non-compressed data are compared to determine the most efficient print data transfer scheme.

5 Claims, 3 Drawing Sheets

PRINT DATA TRANSFER METHOD FOR REDUCING FIRST PRINT TIME

BACKGROUND OF THE INVENTION

1. Field of the Invention

The present invention relates to a method of transferring print data from a host computer to a printer connected to the host. The present invention also relates to a printer controller for implementing the method, and to a computer program for executing the method.

2. Description of the Related Art

The performance of a printer can be evaluated by factors such as PPM (Print Per Minute: the number of printed sheets produced per minute) and FPT (First Print Time: the time taken for the printer to begin the first printing after the print command is issued by the user). In improving the efficiency of print operation, people often regard PPM as the more important factor than FPT because it concerns the net printing speed of the printer. For increasing the gross throughput, however, FPT is also an important factor, and should be made as short as possible.

Generally the first print time depends on the amount of print data to be transferred and the data transfer rate of the interface between the host computer and the printer. Specifically, as the amount of print data is smaller and/or the data transfer rate is higher, FPT becomes shorter. On the other hand, as the amount of print data is greater and/or the data transfer rate is lower, FPT becomes longer.

In a conventional data transfer system, the standard interface between the host and the printer is usually the centronics interface whose data transfer rate may be 100 KB/s~200 KB/s at best. To compensate for the slowness of the transfer rate, the print data is compressed by an appropriate compression method. Accordingly, the volume of the print data is reduced, which contributes to the shortening of the net time taken for data transfer from the host to the printer. The conventional scheme, however, sometimes fails to shorten the first print time, and even prolongs it due to the additional time taken for the host to compress the print data and for the printer to decompress the transferred data.

SUMMARY OF THE INVENTION

The present invention has been proposed under the circumstances described above. It is, therefore, an object of the present invention to provide a data transfer method whereby the necessity of data compression is automatically determined for reducing the first print time.

According to a first aspect of the present invention, there is provided a method of transferring print data to a printer from a host computer performing a plurality of data compression techniques. The method comprises the steps of: determining a data transfer rate of an interface connecting the host computer and the printer; estimating data compress/decompress time for each of the data compression techniques before the print data is transferred from the host computer to the printer; estimating both transfer time of compressed print data for each of the data compression techniques and transfer time of non-compressed print data, the estimation of the data transfer times being based on the data transfer rate of the interface; calculating transfer process time for each of the data compression techniques by adding the estimated data compress/decompress time to the estimated data transfer time of the compressed print data; selecting a shortest time from the calculated transfer process times and the estimated data transfer time of the non-compressed print data, to determine a data compress/decompress technique attaining the shortest time; and processing the print data by the determined data compress/decompress technique, to transfer the processed print data to the printer.

Preferably, the estimation of the data compress/decompress time may be performed by utilizing part of the print data.

Preferably, the method of the present invention may further comprise the step of sorting objects of different formats included in the print data.

According to a second aspect of the present invention, there is provided a printer controller for transferring print data to a printer from a host computer performing a plurality of data compression techniques. The controller comprises: a transfer rate determiner that determines a data transfer rate of an interface connecting the host computer and the printer; a data compress/decompress time estimator that estimates a data compress/decompress time estimator for each of the data compression techniques before the print data is transferred from the host computer to the printer; a transfer time estimator that estimates both transfer time of compressed print data for each of the data compression techniques and transfer time of non-compressed print data, the estimation of the transfer times being based on the data transfer rate of the interface; a transfer process time calculator that calculates transfer process time for each of the data compression techniques by adding the estimated data compress/decompress time to the estimated data transfer time of the compressed print data; a selector that selects a shortest time from the calculated transfer process times and the estimated data transfer time of the non-compressed print data, to determine a data compress/decompress technique attaining the shortest time; and a processor that processes the print data by the determined data compress/decompress technique, to transfer the processed print data to the printer.

According to a third aspect of the present invention, there is provided a computer program for transferring print data to a printer from a host computer performing a plurality of data compression techniques. The program causes the host computer to execute the steps of: determining a data transfer rate of an interface connecting the host computer and the printer; estimating data compress/decompress time for each of the data compression techniques before the print data is transferred from the host computer to the printer; estimating both transfer time of compressed print data for each of the data compression techniques and transfer time of non-compressed print data, the estimation of the data transfer times being based on the data transfer rate of the interface; calculating transfer process time for each of the data compression techniques by adding the estimated data compress/decompress time to the estimated data transfer time of the compressed print data; selecting a shortest time from the calculated transfer process times and the estimated data transfer time of the non-compressed print data, to determine a data compress/decompress technique attaining the shortest time; and processing the print data by the determined data compress/decompress technique, to transfer the processed print data to the printer.

Other features and advantages of the present invention will become apparent from the detailed description given below with reference to the accompanying drawings.

DETAILED DESCRIPTION OF THE PREFERRED EMBODIMENTS

Preferred embodiments of the present invention will be described below with reference to the accompanying drawings.

Figure 1:
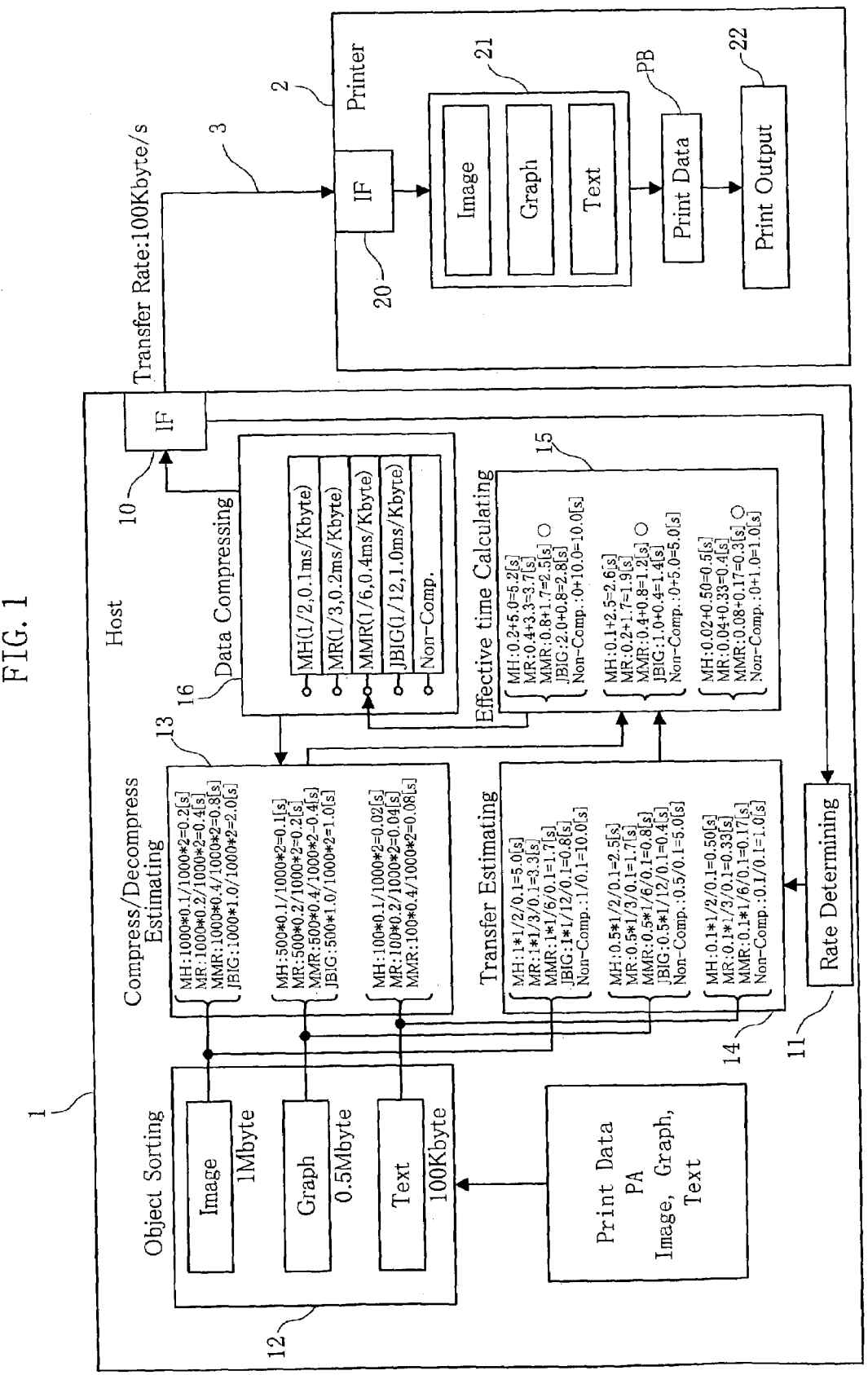
FIG. 1 is a chart showing a print data transfer system according to the present invention.

FIG. 1 shows a print data transmission system according to a first embodiment of the present invention. The illustrated system includes a host computer 1 and a printer 2 connected to the host 1 by a connecting cable 3. One end of the cable 3 is connected to the interface circuit 10 of the host 1, while the other end is connected to the interface circuit 20 of the printer 2. The interface circuits 10, 20 conform to the centronics interface protocol as well as to high-speed interfaces protocols for LAN (10BASE-T, 100BASE-TX, 1000BASE-T) and USB (Low-speed, Full-speed, High-speed), for example. Physically, the host 1 and the printer 2 are each provided with several connectors designed for the different interface protocols.

For performing required functions, various kinds of software, including an OS, a printer driver and application programs, are installed into the host 1. The installed printer driver controls the printer 2. Functionally, the printer driver realizes a data transfer rate determining section 11, an object sorting section 12, a compress/decompress time estimating section 13, a data transfer time estimating section 14, an effective process time calculating section 15, and a data compressing section 16.

The printer 2 is provided with a decompressing section 21 and a print outputting section 22, both realized by a printer engine installed into the printer 2. The driving mechanisms for actuating the print head, paper transfer rollers, etc. are regulated by the printer engine.

The platforms of the host 1 and the printer 2 of the present invention may be the same as those of conventional machines. These common features, which are obvious to the person skilled in the art, will not be described below.

The application programs installed into the host 1 may be word-processing software, spreadsheet software, photo retouching software, etc. With the aid of these programs, the user of the host 1 can produce files of different kinds, such as text-formatted files, graph-formatted files, and image-formatted files. After a file is produced, the print data of the file is supplied to the printer driver of the host 1 upon issuance of the print command by the user (S1 in FIG. 3). In the example shown in FIG. 1, the print data PA contains image-formatted data, graph-formatted data and text-formatted data.

When the print data PA is sent to the printer driver, the data transfer rate determining section 11 checks what kind of interface is currently used between the host 1 and the printer 2. Then, based on the result of the checking, the section 11 works out a data transfer rate at which the print data PA is to be sent (S2 in FIG. 3). To this end, the host 1 may be provided with a "table" in which each of the interface types (i.e. centronics, LANs, USB, etc.) is uniquely associated with a data transfer rate at which the print data is to be transferred from the host 1 to the printer 2. With this arrangement, upon finding that e.g. a centronics interface is employed, the section 11 refers to the table mentioned above, to determine that the data transfer rate is 100 KB/s, for example. A similar determination is made when the currently employed interface is LAN or USB.

In the above embodiment, a constant data transfer rate is determined in accordance with the type of the currently used interface. According to the present invention, however, the determined data transfer rate for a particular type of interface may not necessarily be constant. Specifically, when the currently used interface is LAN, the actual data transfer rate may fluctuate depending on the traffic of the network. To deal with such a situation, the rate determining section 11 may be arranged to monitor the actual data transfer rate of the LAN, so that an optimum data transfer rate (which may vary with time) can be determined for the print data PA based on the results of the monitoring.

Figure 3:
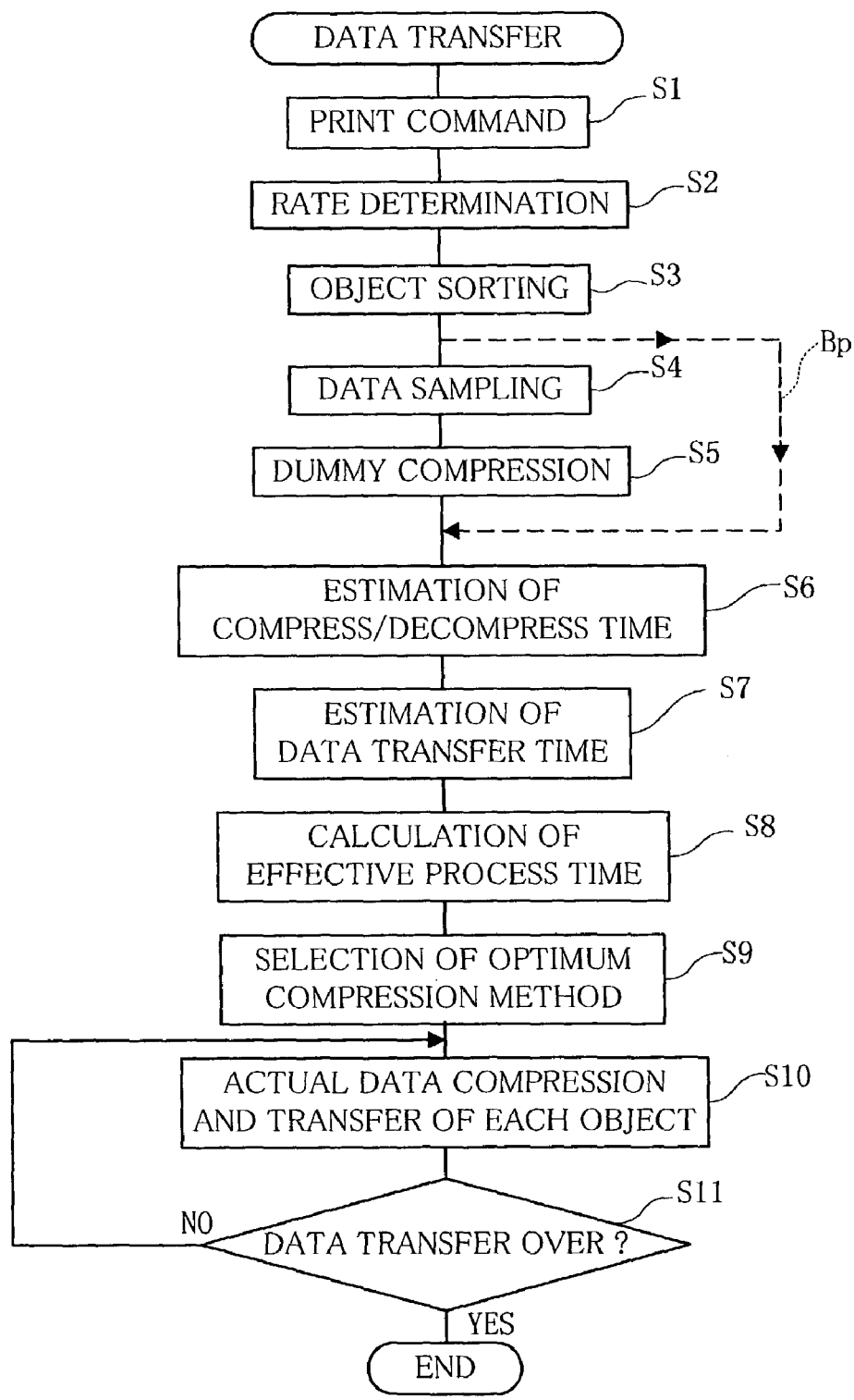
FIG. 3 is a flow chart illustrating the print data transfer procedure of the present invention.

After the transfer rate is determined (S2 in FIG. 3), the print data PA is subjected to "object-sorting" in the section 12 (S3 in FIG. 3). Specifically, the original print data PA, which contains image data, graph data and text data, is sorted into three objects, i.e. an image-format object (1MB), a graph-format object (0.5 MB), and a text-format object (100 KB), in accordance with their differences in data format.

Thereafter, each sorted object is subjected to data sampling, whereby a predetermined amount of sample data (5 KB, for example) is obtained (S4 in FIG. 3). This sample data is used for calculation of "pseudo data compression ratio" and "pseudo unit data compression time." To this end, the 5KB-sample data of the respective objects is sent to the data compressing section 16 for undergoing "dummy data compression" (S5 in FIG. 3) in accordance with several data compression methods available in the host 1. In the illustrated embodiment, the host 1 can perform data compression based on four known methods, namely, MH (Modified Huffman), MR (Modified Read), MMR (Modified Modified Read) and JBIG (Joint Bi-level Image experts Group). The 5 KB-sample data is compressed by each of the methods, to provide the "pseudo data compression ratio" (=[volume of the compressed data]÷[initial volume of the sample data]). Together with this compression ratio, the "pseudo unit compression time" (=[time taken for dummy compression] ÷[initial volume of the sample data]) is calculated.

After the pseudo data compression ratio and the pseudo unit compression time are obtained for each of the four compression methods, the results may be stored in the data compressing section 16 (see. FIG. 1). In the illustrated example, the compression ratio and the unit compression time are 1/2 and 0.1 ms/KB by MH, 1/3 and 0.2 ms/KB by MR, 1/6 and 0.4 ms/KB by MMR, 1/12 and 1.0 ms/KB by JBIG. When no compression is performed, the compression ratio is 1, and the unit compression time is zero.

As noted above, the three kinds of object data are subjected to data sampling (S4) and dummy compression (S5). At the same time, each object data (1 MB, 0.5 MB and 100 KB in the illustrated case) is sent to the compress/decompress time estimating section 13 and to the data transfer time estimating section 14. In the section 13, the estimation of the data compression and decompression time (CT+DT in FIG. 2) for each object data is performed (S6 in FIG. 3) on the basis of the following formula (1).

$$[CT+DT]=2\times[\text{actual volume of object data}]\times[\text{pseudo unit compression time}] \quad (1)$$

The factor "2" is added since the data decompression time can be regarded as substantially equal to the data compression time. The pseudo unit compression time is obtained by accessing the data stored in the data compressing section 16.

Meanwhile, in the section 14, the estimation of the data transfer time (DTT in FIG. 2) is performed (S7 in FIG. 3) on the basis of the following formula (2).

$$[DTT] = [\text{actual volume of object data}] \times \quad (2)$$
$$[\text{pseudo data compression ratio}] \div$$
$$[\text{transfer rate of the cable}]$$

The pseudo data compression ratio is also obtained by accessing the data stored in the data compressing section 16.

The data process time (CT+DT) and the data transfer time (DTT) are sent to the effective process time calculating section 15, in which the two pieces of data are added to provide an estimate of the effective process time EPT (S8 in FIG. 3).

The above addition is performed for the respective compression methods and for the non-compression method. Thereafter, the results of the addition are compared to select the most efficient, i.e. fastest compression method for each object data (S9 in FIG. 3). In the section 15 shown in FIG. 1, the most efficient method is indicated by a circle (∘). In the illustrated example, the MMR happens to be the most efficient data compression method for all the three objects (image, graph and text).

The above-described process ("preliminary process") is performed prior to the effective data transfer operation. More precisely, the preliminary process begins upon issuance of a print command from the user, and ends with the determination of the most efficient compression methods. Thus, as seen from the above explanation, the preliminary process includes steps as follows: the transfer rate determining by the section 11, the object sorting by the section 12, the dummy data compression by the section 16, the compress/decompress time estimating by the section 13, the transfer time estimating by the section 14, and the effective process time calculating by the section 15.

After the preliminary process is over, each of the three sorted objects of the print data PA is subjected to actual (i.e. not dummy) data compression, or non-compression, in the section 16 (S10 in FIG. 3). The actual data compression is performed by the most efficient compression method determined in the preliminary process.

The compressed (or non-compressed) object data is then transferred from the host 1 to the printer 2. For enabling the printer 2 to properly decompress the supplied data, "header information" regarding the selected data compression method is also sent to the printer 2 together with the compressed object data. When all the data is transferred to the printer 2 (S11: YES in FIG. 3), the printer driver of the host 1 ends the data transfer procedure.

Figure 2:
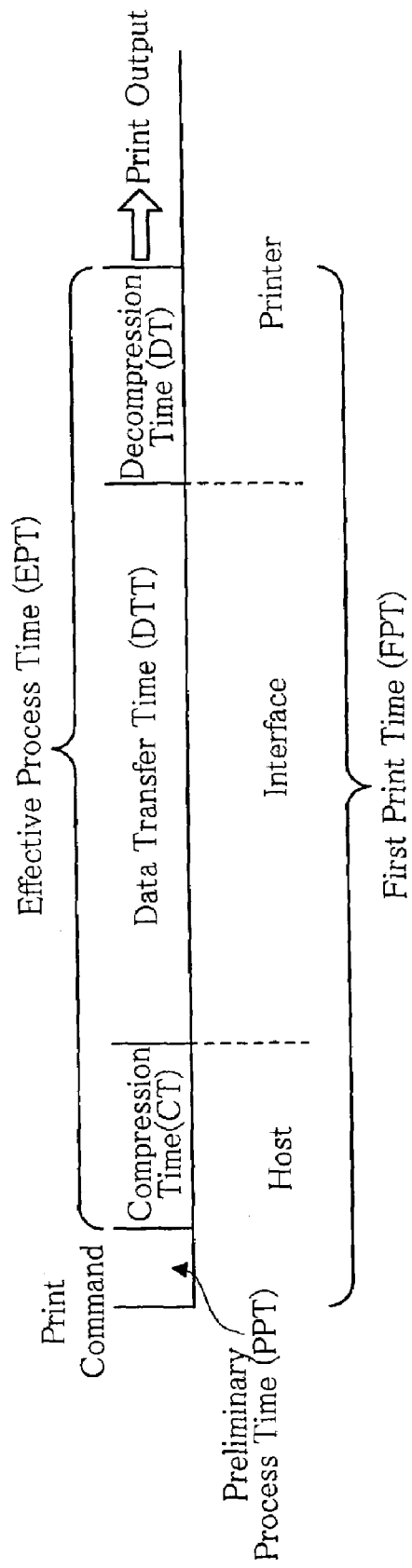
FIG. 2 is a time chart for illustrating the present invention.

The print data from the host 1 is supplied to the decompressing section 21 of the printer engine, in which the received object data is decompressed. Then, the decompressed data is developed in a buffer memory of the printer 2, to provide print data PB. Then, the print data PB is sent to the print outputting section 22, whereby the actuating system of the printer 2 starts to operate for printing on the first paper sheet. In FIG. 2, "First Print Time(FPT)" refers to the time taken for the first printing operation to start after the print command is issued. As seen from the figure, the FPT is the sum of the preliminary process time(PPT), the actual data compression time(CT), the data transfer time(DTT), and the actual data decompression time(DT). If the actual data compression is not performed, CT and DT are both zero.

In FIG. 2, the preliminary process time(PPT) is depicted as a fairly long period of time, almost equal to a half of the data compression time(CT). In reality, however, the PPT is negligible in comparison with the CT, so that the effective process time(EPT) is substantially equal to the first print time(FPT). The shortness of the PPT is ascribed to the fact that only a part of the object data is subjected to the dummy compression.

Referring to FIG. 3 again, a second embodiment of the present invention will now be described. The print data transfer system of the second embodiment is similar to that of the first embodiment except for some aspects noted below. For avoiding redundancy, the features that the second embodiment shares with the first embodiment will not be described.

The print data transfer of the second embodiment proceeds as follows. Upon issuance of a print command from the user (S1 in FIG. 3), the data transfer rate determining section 11 of the host 1 determines the data transfer rate of the cable 3 (S2). Alternatively, the determination of the data transfer rate may be performed before the issuance of the print command.

Then, the object-sorting of the print data PA is performed by the object sorting section 12 (S3). At this stage, only a predetermined amount of data taken from the print data PA is subjected to the object-sorting. For example, assuming that the volume of the print data PA is 10 MB, a part of the data PA is sorted into the three objects, namely, the image-formatted object (1 MB), the graph-formatted object (0.5 MB) and the text-formatted object (0.1 MB).

Then, bypassing the steps at S4 and S5 in FIG. 3 (see the broken-like path Bp), the procedure goes to S6, where the estimation of the data compress/decompress time is performed. The estimation is based on the following formula (3).

$$[CT+DT]=2\times[\text{volume of object data}]\times[\text{unit compression time}] \quad (3)$$

In this formula again, the data compression time and the decompression time are regarded as equal (hence the factor "2"). Differing from the counterpart of the first embodiment, the unit compression time of the formula (3) may be a theoretical value which is plausible but not based on an actual data compression experiment.

Then, at S7, the estimation of the data transfer time is performed, based on the following formula (4).

$$[DTT] = [\text{actual volume of object data}] \times \quad (4)$$
$$[\text{data compression ratio}] \div$$
$$[\text{transfer rate of the cable}]$$

Like the unit compression time in the formula (3), the data compression ratio may be a theoretical value, which is not obtained by an actual time-measuring operation for compressed data.

The calculated "data compress/decompress time" and "data transfer time" are supplied to the effective process time calculating section 15 to find the total (S8). Thereafter, as in the first embodiment, the most efficient compression method is determined for each object data (S9), and the print data is transferred to the printer 2 after the respective objects are compressed (or non-compressed) by the selected compression method (S10).

According to the second embodiment, the object sorting is performed with respect to a part of the print data PA, which is advantageous to time-saving. Also, the dummy compression, which is required to be performed in the first embodiment, is unnecessary for the second embodiment. Thus, the estimation of the data compression time and data transfer time can be instantaneously performed.

According to the present invention, the most efficient data compression method is automatically selected within a very short period of time. Thus, the first print time can be shortened in comparison with the conventional system.

It should be noted that the present invention is not limited to the above-described first and second embodiments. For instance, if the print data PA is composed of only one kind of data (e.g. text-formatted data), the object-sorting in the section 12 of the host 1 does not need to be performed. To connect the host 1 and the printer 2, RS-232C or SCSI interface can also be utilized. The cable 3 may be replaced by a wireless LAN or IrDA (Infrared Data Association), for example.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

The invention claimed is:

1. A method of transferring print data to a printer from a host computer performing a plurality of data compression techniques, the method comprising:

determining a data transfer rate of an interface connecting the host computer and the printer;

estimating data compress/decompress time for each of the data compression techniques before the print data is transferred from the host computer to the printer;

estimating both transfer time of compressed print data for each of the data compression techniques and transfer time of non-compressed print data, the estimation of the data transfer times being based on the data transfer rate of the interface;

calculating transfer process time for each of the data compression techniques by adding the estimated data compress/decompress time to the estimated data transfer time of the compressed print data;

selecting a shortest time from the calculated transfer process times and the estimated data transfer time of the non-compressed print data, to determine a data compress/decompress technique attaining the shortest time; and processing the print data by the determined data compress/decompress technique, to transfer the processed print data to the printer.

2. The method according to claim 1, wherein the estimation of the data compress/decompress time is performed by utilizing part of the print data.

3. The method according to claim 1, further comprising the step of sorting objects of different formats included in the print data.

4. A printer controller for transferring print data to a printer from a host computer performing a plurality of data compression techniques, the controller comprising:

a transfer rate determiner that determines a data transfer rate of an interface connecting the host computer and the printer;

a data compress/decompress time estimator that estimates a data compress/decompress time estimator for each of the data compression techniques before the print data is transferred from the host computer to the printer;

a transfer time estimator that estimates both transfer time of compressed print data for each of the data compression techniques and transfer time of non-compressed print data, the estimation of the transfer times being based on the data transfer rate of the interface;

a transfer process time calculator that calculates transfer process time for each of the data compression techniques by adding the estimated data compress/decompress time to the estimated data transfer time of the compressed print data;

a selector that selects a shortest time from the calculated transfer process times and the estimated data transfer time of the non-compressed print data, to determine a data compress/decompress technique attaining the shortest time; and a processor that processes the print data by the determined data compress/decompress technique, to transfer the processed print data to the printer.

5. A computer readable medium storing a computer program transferring print data to a printer from a host computer performing a plurality of data compression techniques, the program causing the host computer to perform:

determining a data transfer rate of an interface connecting the host computer and the printer;

estimating data compress/decompress time for each of the data compression techniques before the print data is transferred from the host computer to the printer;

estimating both transfer time of compressed print data for each of the data compression techniques and transfer time of non-compressed print data, the estimation of the data transfer times being based on the data transfer rate of the interface;

calculating transfer process time for each of the data compression techniques by adding the estimated data compress/decompress time to the estimated data transfer time of the compressed print data;

selecting a shortest time from the calculated transfer process times and the estimated data transfer time of the non-compressed print data, to determine a data compress/decompress technique attaining the shortest time; and processing the print data by the determined data compress/decompress technique, to transfer the processed print data to the printer.

* * * * *